(12) United States Patent
Schneider et al.

(10) Patent No.: US 7,351,506 B2
(45) Date of Patent: Apr. 1, 2008

(54) POLYMERIZATION-ENCAPSULATED CHOLESTERIC LIQUID CRYSTAL FOR BISTABLE REFLECTIVE DISPLAYS

(75) Inventors: Tod Schneider, Kent, OH (US); Forrest Nicholson, Kent, OH (US); Liang-Chy Chien, Hudson, OH (US)

(73) Assignee: Kent Displays, Incorporated, Kent, OH (US)

( * ) Notice: Subject to any disclaimer, the term of this patent is extended or adjusted under 35 U.S.C. 154(b) by 225 days.

(21) Appl. No.: 11/191,430

(22) Filed: Jul. 27, 2005

(65) Prior Publication Data

US 2007/0026163 A1 Feb. 1, 2007

(51) Int. Cl.
*C09K 19/52* (2006.01)
*C09K 19/00* (2006.01)

(52) U.S. Cl. ............... 430/20; 430/270.1; 252/299.01; 428/1.1; 428/1.3

(58) Field of Classification Search ............. 428/1.1, 428/1.3; 252/299.01; 430/270.1, 20
See application file for complete search history.

(56) References Cited

U.S. PATENT DOCUMENTS 6,061,107 A    5/2000  Yang et al. ............... 349/86
7,119,859 B2 * 10/2006  Chari et al. ............... 349/88

OTHER PUBLICATIONS

Pages 1019-1022 *SID 97 Digest* Chapter 42.3: Reflective Multicolor Display Using Cholesteric Liquid Crystals; M. Okada, T. Hatano, K.Hashimoto, Minolta Co., Lts., Osaka, Japan, 1997.
Pages 163-166 *SID 97 Digest* entitled Compatability of Birefringent Plastic Substrates with High Resolution Relfective Cholesteric Liquid Crystal Displays; Kellie D. Hoke, Donald J. Davis, Asad A. Khan and J. William Doane, Kent Displays, Inc., Kent OH, 1997.

Pages 770-773 *SID 04 Digest* Chapter 16.2: A Fully Flexible Colour Display; Peter Slikkerveer, Piet Bouten, Peter Cirkel, Judity de Goede, Henri Jagt, Nico Kooyman, Giovanni Nisato, Ronald van Rijswijk and Paul Duineveld, Phillips Research Laboratories, Eindhoven, The Netherlands, 2004.
Field controlled light scattering from nematic microdroplets (3 pgs); accepted for publication Nov. 23, 1985; J.W. Doane, N.A. Vaz, B.G. Wu and S. Zumer; *Liquid Crystal Institute and Department of Physics*, Kent State University, Kent, OH.
Pages 30-97 *World Scientific*; Series on Liquid Crystals, vol. 1 titled Liquid Crystal Dispersions; Paul S. Drzaic, Raychem Corporation; Singapore, New Jersey, London, Hong Kong, 1995.
Pages 774-777 *SID 04 Digest* Chapter 16.3: Development of a Flexible Electronic Display Using Photographic Technology; Stanley W. Stephenson, David M. Johnson, John I. Kilburn, Xiang-Dong Mi, Charles M. Rankin and Robert G. Capurso, Eastman Kodak Company, Research & Development Laboratories, Rochester, NY, 2004.

* cited by examiner

*Primary Examiner*—Geraldina Visconti
(74) *Attorney, Agent, or Firm*—Renner Kenner Greive Bobak Taylor & Weber

(57) ABSTRACT

A liquid crystal polymer dispersion is formed where liquid crystal encapsulation is produced by a process in which a reactive additive formulation is mixed and photo-polymerized. The polymerizable additive formulation includes monofunctional, multifunctional and photoinitiator compounds in specific composition. The polymerizable additive formulation enhances the control of deformed globule or droplet size, structure integrity, electro-optical properties, and prohibits flow of the liquid crystal as it is encapsulated. A simple process and a controllable system for encapsulating cholesteric materials that provides rugged low-power flexible passively-driven displays. Such displays offer the possibility of lower cost roll-to-roll manufacturing in addition to lighter weight, more rugged and conformable displays.

27 Claims, 7 Drawing Sheets

POLYMERIZATION-ENCAPSULATED CHOLESTERIC LIQUID CRYSTAL FOR BISTABLE REFLECTIVE DISPLAYS

TECHNICAL FIELD

In general, the present invention is directed to liquid crystal displays. In particular, the present invention is directed to flexible cholesteric liquid crystal displays. Specifically, the present invention is directed to a polymer dispersed liquid crystal display with controlled liquid crystal droplet size.

BACKGROUND OF THE INVENTION

Nearly every commercial electrically addressable liquid crystal display (LCD) manufactured and sold today utilizes glass substrates and the remaining few utilize small rigid plastic substrates. In all cases, the liquid crystal material is sandwiched between two such spaced substrates. The spacing between the substrates is generally controlled by either glass or plastic spacers that are often of a spherical or cylindrical shape or posts that are fixed to one substrate. Lack of flexibility and durability provide significant challenges in the manufacture of LCDs. Both challenges can be alleviated by using flexible plastic substrates. However, pressure points remain a significant problem.

Force applied to one of the substrates, commonly referred to as a pressure point, causes a deformation and nonuniformity in the cell spacing. As the gap between the substrates becomes smaller due to applied localized pressure, the liquid crystal flows radially out of the area. A resulting texture is apparent on the display due to the flowing liquid crystal. In a typical flat-panel computer LCD, this is an easily observable effect as the liquid crystal flows upon touching the screen and is visible by concentric rings of brighter and darker areas flowing away from the pressure point like ripples created on the surface of water as it is disturbed. Pressure points created in typical LCDs are an annoyance, but in operation the distortions in the liquid crystal director are transient and quickly relax back out of the structure due to the applied electric field used to refresh the pixel. Typical LCDs such as twisted nematic, supertwisted nematic, and in-plane switched must be constantly updated with an electric field to be switched as these liquid crystal materials are not bistable. As used herein, the term "stable" refers to the ability of a cholesteric or chiral nematic liquid crystal texture to remain even after removal of an applied electric field or other physical phenomenon such as pressure, magnetic field or the like. Bistable means that there are two liquid crystal textures or states that remain after removal of an applied electric field. In most instances, the bistable textures are focal conic and planar, wherein the focal conic texture scatters impinging light and the planar texture reflects the impinging light.

Cholesteric liquid crystal displays (ChLCDs) are bistable reflective LCDs that exhibit high reflectance and low power consumption. As such, they are suitable for numerous applications from small handheld devices to large area signage. Indeed, the most recent area of application for these displays is in high resolution electronic books where the technology can be applied with a low-cost passive matrix. As with most commercial LCDs, ChLCDs are typically made on glass substrates and often use a thick protective glass substrate to prevent pressure points. The need and desire to use plastic substrates in place of the typical glass substrates has been present since the beginning of volume LCD manufacturing. However, this change requires significant effort. ChLCDs lend themselves to conform to plastic substrates very easily. They do not require polarizers, there is no condition for non-birefringent substrates, and they do not necessarily require precise anchoring alignment control as do twisted nematic or super-twisted nematic LCDs. These and other features are strong motivating factors in the development of light weight flexible cholesteric displays.

The cholesteric material can be electrically switched to either one of two textures, planar or focal conic. In the planar texture, the director of the LC lies parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high thus the helical domain size becomes small and randomized in orientation such that it is just forward scattering and does not reflect impingent light. Once the defect structures are created in the liquid crystal phase, they are topologically stable and cannot be removed unless by some external force such as an electric field. Thus, the focal conic texture remains stable and forward scatters light of all wavelengths into an absorbing (usually black) background. These bistable structures can be electronically switched between each other at rapid rates (on the order of milliseconds). Gray scale is also available within a single pixel by applying intermediate voltages between the planar and focal conic states to adjust the ratio of reflective helical domains that are oriented perpendicular to the substrates (planar texture) to the randomized forward scattering domains (focal conic texture).

Bistable cholesteric liquid crystal displays have several important electronic drive features that other bistable reflective technologies do not. Of extreme importance for addressing a matrix of many pixels in a display is the characteristic of a voltage threshold. A threshold is essential for multiplexing a row/column matrix without the need of an expensive active matrix which requires a transistor at each pixel. Bistability with a voltage threshold allows very high-resolution displays to be produced with low-cost passive matrix technology. And gray scale capability allows stacked red-green-blue (RGB), high-resolution displays with full-color capability where as many as 4096 colors have been demonstrated.

Another important feature of cholesteric materials is that the RGB colors, as well as infrared (IR) night-vision, can be stacked (layered) on top of each other without optically interfering with each other. This makes maximum use of the display surface for reflection and hence brightness. This feature is not provided by traditional displays where the display is broken into pixels of different colors and only one-third of the incident light is reflected. Using all available light is important in observing a reflective display in a dimly lit room without a backlight. Because a cholesteric display cell does not require polarizers, low cost birefringence plastic substrates such as polyethylene terephthlate (PET) can be used. Other features, such as wide viewing-angles and wide operating temperature ranges as well as fast response times make the cholesteric technology the bistable reflective technology of choice for many applications.

Pressure points pose a significant challenge in creating a practical bistable cholesteric liquid crystal display. In bistable cholesteric liquid crystal displays, pressure points commonly appear as bright areas in the dark state and are highly visible until the pixel is refreshed. The only way to address this problem with known technology is to prevent the formation of pressure points in the first place by using a thick rigid protective glass substrate over top of the display or to encapsulate the liquid crystal with a polymer. Polymer encapsulation may be achieved through either emulsification or phase separation, as with polymer dispersed liquid crystal (PDLC). PDLC displays can be made from the following phase separation processes; polymerization induced phase separation (PIPS), thermally-induced phase separation (TIPS), and solvent-induced phase separation (SIPS). In the PIPS process, the polymer separates from the liquid crystal during polymerization as the molecular chain length increases. For TIPS, the liquid crystal is mixed with a thermoplastic polymer in a melt. As the melt cools, the polymer begins to solidify causing the liquid crystal to phase separate. An example of the TIPS process is disclosed in U.S. Pat. No. 6,061,107. The SIPS process involves mixing the liquid crystal, polymer, and an organic solvent to the single phase. When the film is cast, the solvent is allowed to evaporate out causing the liquid crystal to phase separate from the polymer. And although manufacture of polymer dispersed liquid crystal displays using plastic substrates with the TIPS process has been suggested, their manner of construction using thermoplastic polymer materials limits their use in flexible displays. Such a construction provides liquid crystal materials mixed with polymer materials that have a relatively low glass transition temperature. Accordingly, with only a minimum amount of heat applied, the polymer and liquid crystal material would likely revert to a homogeneous single phase causing the display to at least be rendered momentarily inoperative. And un-controlled re-cooling of such a display would likely result in droplets that are either too small (rapid cooling) or too large (slow cooling) for the prescribed electro-optic switching parameters as well as reducing or destroying the desired optical behavior. In compositions where the encapsulated TIPS display had adjacent liquid crystal droplets pitch changed through UV radiation (to make multi-colored pixels), reheating the composition to the single phase would destroy the multi-color display as all the different pitch chiral materials would become intermixed into a single pitch. Therefore, there is a need in the art for cholesteric liquid crystal displays with all of their aforementioned benefits but which can be practically implemented with flexible plastic substrates.

SUMMARY OF THE INVENTION

In light of the foregoing, it is a first aspect of the present invention to provide polymerization-encapsulated cholesteric liquid crystal for bistable reflective displays.

It is another aspect of the present invention to provide a bistable polymer dispersed liquid crystal display comprising at least one substrate, and a liquid crystal dispersion disposed on the at least one substrate, the dispersion comprising a plurality of domains, wherein the liquid crystal dispersion comprises at least a non polymerizable liquid crystal material, a mixture of polymerizable monomers, and a polymerization initiator, wherein the polymerizable monomers comprise one or more polymerizable groups and wherein a size of each domain is controlled by a functionality of the polymerizable monomers defined by $$F = \sum_{x=1}^{n} f_x^* M_x \bigg/ \sum_{x=1}^{n} M_x,$$

wherein F is functionality, $f_x$ is the number of polymerizable groups, $M_x$ is a mass fraction of the dispersion material, and n is the number of polymerizable monomers in the dispersion.

Another aspect of the present invention is to provide method of preparing a polymer dispersed liquid crystal display comprising mixing a liquid crystal dispersion comprising a non-polymerizable liquid crystal material, a mixture of polymerizable monomers, and a polymerization initiator, and phase separating the liquid crystal dispersion into a plurality of domains controlling a size of each domain by selecting the functionality of the polymerizable monomers, wherein the polymerizable monomers comprise one or more polymerizable groups, and wherein the functionality of the polymerizable monomers is defined by $$F = \sum_{x=1}^{n} f_x^* M_x \bigg/ \sum_{x=1}^{n} M_x,$$

wherein F is functionality, $f_x$ is the number of polymerizable groups, $M_x$ is a mass fraction of the dispersion material, and n is the number of polymerizable monomers in said dispersion.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
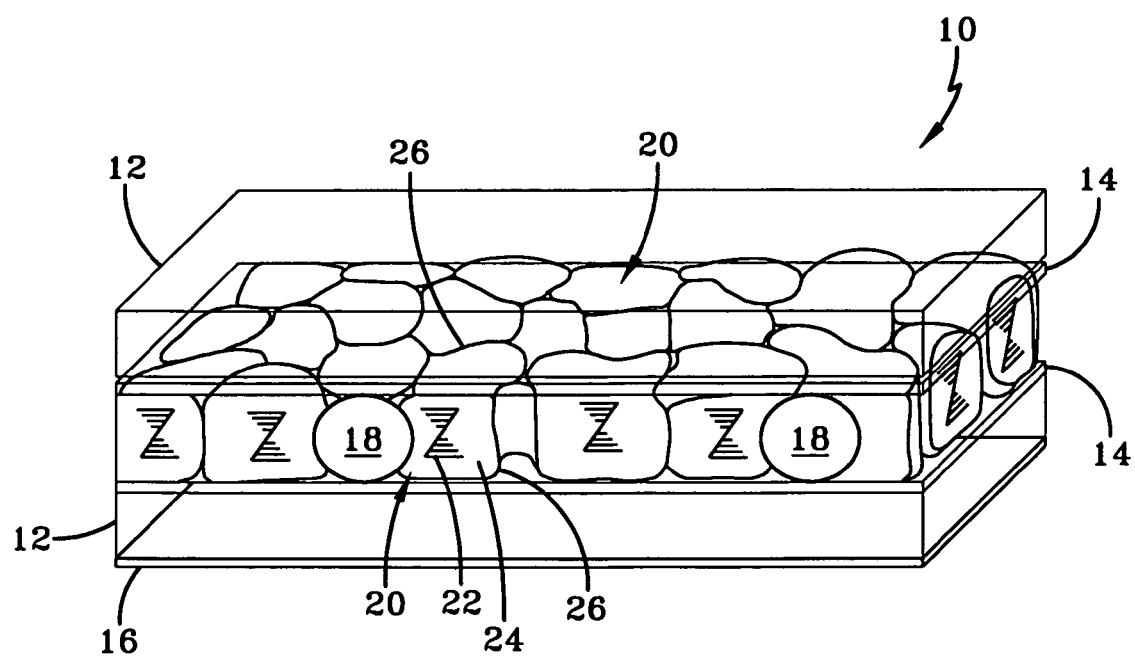
FIG. 1 is a schematic diagram of a flexible encapsulated cholesteric liquid crystal display made in accordance with the concepts of the present invention.
Figure 2A:
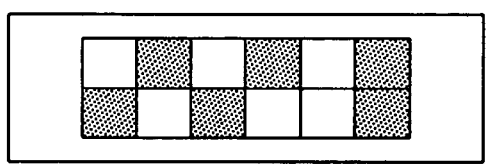
FIGS. 2A-D are representations of an exemplary flexible display contorted in a number of ways.
Figure 2B:
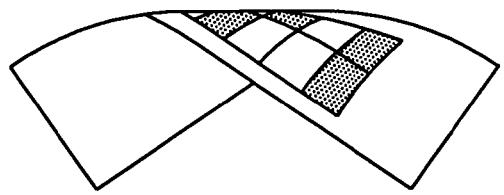
Figure 2C:
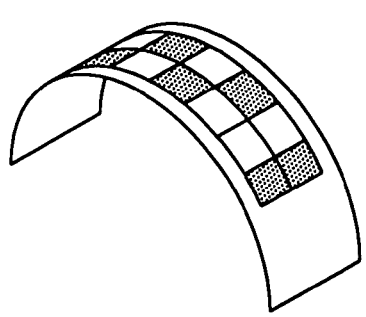
Figure 2D:
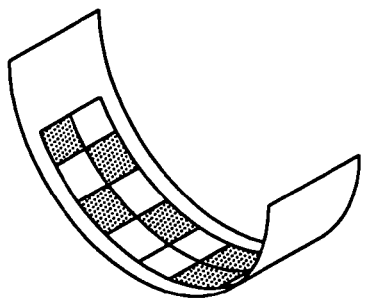

This invention provides a method of making polymer dispersed cholesteric liquid crystal in which discrete volumes of a liquid crystal material are encapsulated by a polymer material. The size of the encapsulated liquid crystal droplet, also referred to as a liquid crystal globule, is controlled through formulations of polymerizable dispersions. As used herein, the term dispersion should be understood to mean a two-phase system i.e., liquid crystal and polymer. In other words, the liquid crystal is distributed or suspended in finely divided particles, in a substance such as a polymer material. Such a construction improves the durability and electro-optic properties of the dispersion film, which is formed by adjoined droplets containing a short-pitch cholesteric liquid crystal with a pre-selected reflective color. The durability of the film permits their use between flexible plastic substrates where flexure of the system does not lead to altering of the texture of the encapsulated liquid crystal material.

In order to create robust flexible ChLCDs using plastic substrates that do not suffer from flow-induced effects such as pressure points, the liquid crystal material must be encapsulated. The two most common methods to encapsulate liquid crystals are by phase separation (which is used with Polymer Dispersed Liquid Crystals (PDLC) systems) and emulsification (or microencapsulation) of the liquid crystal in a binder. Both methods have their advantages and disadvantages; however, it has been determined that phase separation offers opportunities for process simplicity in the control of droplet size and morphology.

During PIPS, droplets of liquid crystal are excluded from the bulk via phase separation as the polymeric chains grow in molecular weight. Hence, the process of phase separation is a dynamic process with many variables. Initially, it is important that the pre-polymer composition and liquid crystal mix to form a homogeneous single phase so the process starts with uniformity. As the liquid crystal begins to phase separate into droplets, the drops have time to coalesce. Therefore, the speed at which the dispersion polymerizes is crucial to controlling the uniformity of droplet formation. A few different methods to control the speed of photo-polymerization are: the reactivity of the components, the monomer to liquid crystal volume (weight) fraction, the amount of photoinitiator relative to polymer, the monomer size (viscosity), the crosslinking density, and the intensity of UV radiation.

Suitable liquid crystals include cholesteric liquid crystals such as KLC19—righthanded mixture, KLC20—lefthanded mixture of suitable electro-optic properties. Cholesteric liquid crystalline materials are unique in their optical and electro-optical features. Of principal significance, they can be tailored to Bragg reflect light at a pre-selected wavelength and bandwidth as these materials posses a helical structure in which the liquid crystal (LC) director twists around a helical axis. The distance over which the director rotates 360° is referred to as the pitch and is denoted by P. The reflection band of a cholesteric liquid crystal is located at the wavelength, $\lambda_o=0.5(n_e+n_o)$ and has the bandwidth, $\Delta\lambda=(n_e-n_o)P$ which is usually about 100 nm, where $n_e$ and $n_o$ are the extra-ordinary and ordinary refractive indices of the LC, respectively. The reflected light is circularly polarized with the same handedness as the helical structure of the LC. If the incident light is not polarized, it will be decomposed into two circular polarized components with opposite handedness and one of the components reflected.

As will be described, the materials used herein provide monomer formulations for liquid crystal-polymer dispersions, such that the formulations enable the nucleation and growth of uniform liquid crystal encapsulates with the appropriate size and proper liquid crystal alignment (planar anchoring). The materials are also configured to form mechanically stable dispersion films that prohibit macroscopic liquid crystal flow in either the reflective or non-reflective states. And the materials and their processing enable the dispersion film fabrication on flexible substrates such as plastics, fabrics, papers or any applicable substrates through laminating pre-spaced solutions sandwiched between substrates. The use of monomers and their cross-linking in the phase separation process raises the glass transition temperature range from 50° C. to 250° C., and preferably between 100° C. and 250° C., so that the formed polymer walls encapsulating the liquid crystal are stable with commonly encountered applications of heat.

Referring now to the drawings, and in particular to FIG. 1, it can be seen that a liquid crystal display made in accordance with the present invention is designated generally by the numeral 10. The display 10 provides a pair of opposed substrates 12 which may be either plastic or glass and wherein plastic substrates allow for the display 10 to be flexed or contorted. In some instances, only one substrate may be needed. Disposed on facing surfaces of the substrates 12 is a conductive electrode 14. The conductive electrodes 14 may be in the form of indium-tin oxide, indium-zinc oxide, or any other conductive material used for liquid crystal display electrodes. Surface treatments may be applied to the electrodes 14 for the purpose of controlling characteristic features of the liquid crystal material received between the substrates. A light absorbing plate 16 may be disposed on an outer surface of one of the substrates so as to provide the cell with a black appearance when the liquid crystal material is in a focal conic texture. A plurality of spacers 18 are disposed between the substrate surfaces and are used to provide a uniform gap or controlled distance between the substrates. The liquid crystal material is received between the substrates 12 and is processed in such a manner as to form a plurality of liquid crystal domains, or droplets, designated generally by the numeral 20. The domains 20 are encapsulated cholesteric liquid crystal material, all of which are shown in the planar state.

As discussed previously, the twisted planar condition allows for reflection of impinging light and reflects color based upon the amount of chiral material contained within the liquid crystal. If the domains are in a focal conic texture, then light is forward scattering and the display would appear black provided the light absorbing plate 16 is utilized. The domains 20 comprise a liquid crystal material 22 which is encapsulated by polymer 24. A boundary or domain wall 26 defines the exterior of each domain. Accordingly, adjacent domains have domain or boundary walls 26 which may touch or adjoin one another and the substrates 12. However, the domains 20 are formed in such a manner that the boundary walls do not interlock with one another. In other words, it is believed that rupturing of the boundary wall will not necessitate the rupturing of an adjacent domain's boundary wall. As will be discussed in detail below, the sizing of the domain walls, the thickness of the domain walls and the amount of liquid crystal material and polymer material are variable depending upon the concentrations used.

The display 10 may use the substrates 12 as is common with conventional liquid crystal displays, having their inner surfaces coated with a thin layer of transparent conductive inorganic electrodes 14 (such as indium-tin-oxide, indium-zinc-oxide, etc.) or transparent conductive polymers (such as ELP 3040 [Agfa], Dipcoat [Agfa], S300 [Agfa], etc.). The electrodes may also be in the form of a conductive blend of carbon nanotubes. Another aspect of the display 10 may comprise one substrate 12 coated with a thin layer of conductive electrode 14, a polymer-encapsulated liquid crystal layer comprising the domains 20, and a top layer formed by photopolymerization induced stratification. A single substrate structure enables the addition of a second PDLC layer of the opposite liquid crystal handedness to double reflectivity. A conductive polymer can then be airbrushed, screen-printed, or ink-jetted on top to switch the layer(s). The addition of PDLC stacks without a second substrate drastically improves the flexibility of the LCD.

The material used to form the domains is a polymerizable dispersion or mixture that contains a non-polymerizable liquid crystal, a mixture of polymerizable monomers and a small concentration of a polymerization initiator. The polymerizable monomers, also referred to as photomonomers, and the initiator may be collectively referred to as polymerizable additives. The photomonomers are selected to: have good compatibility or solubility in the non-polymerizable liquid crystal, good polymerizability, demonstrate droplet size control, control the anchoring interaction between the liquid crystal director and the droplet surface, and provide decent impact resistance of the film structure.

Functionality

For a photopolymerization-induced phase separation method, photopolymerizable additives are used to form the boundary wall 26 of the encapsulation or domain 20. A common problem for polymerizable formulation is the need to provide accommodation for many electro-optical performance parameters of a polymer-dispersed liquid crystal (PDLC) device such as the switching voltage, optical contrast ratio, and response time. These parameters are related to the shape, volume and size of the liquid crystal droplets and surface anchoring and director orientation of liquid crystal in the droplets. Further, these parameters are associated with the dynamics of phase separation and related to the rate of polymerization. In case of photopolymerization induced phase separation of polymer in liquid crystal, these parameters are at least related to monomer concentration, monomer functionality, photoinitiator concentration, light wavelength and intensity, and polymerization temperature. At fixed polymerization conditions such as temperature and light source, the polymerizable dispersion and the function of the polymerizable additives play major roles in determining the electro-optical properties of the PDLC device. The function of the polymerizable additives is dependent upon the type of polymerizable group (sometimes called "functional group"), and the number of available polymerizable groups (mono, multiple) in the polymerizable dispersion. The number of polymerizable groups is referred to as the "functionality" of the polymerizable additives. Attributes such as the molecular weight (small, large), rigidity (soft, rigid, linear, branch), and polarity (polar, non-polar) depend upon the "functional group" of the polymerizable additives.

Polymerizable additives having multiple polymerizable groups are sometimes referred to as crosslinkers. Photopolymerization can be controlled by selecting the fraction of the crosslinker in the polymer/LC dispersion, i.e., controlling the rate of polymerization through the functionality of the pre-polymer. The functionality (F), approximates the rate of polymerization by weighting the probability of polymerization through the number of polymerizable groups, on a given monomer with its mass fraction in the dispersion, to the total mass of polymerizable components in the dispersion or mixture as can be defined by the formula:

$$F = \sum_{x=1}^{n} f_x^* M_x \bigg/ \sum_{x=1}^{n} M_x, \quad (1)$$

wherein F is functionality, $f_x$ is the number of polymerizable groups, $M_x$ is a mass fraction of the dispersion material, and n is the number of polymerizable monomers in said dispersion. A higher functionality F yields a faster polymerization rate and higher crosslinking density, which results in a smaller droplet size because of less diffusion time before the polymer gelation. The functional groups are used to modify or control the viscosity of polymerizable additive, the structure of polymer, and interfaces and anchoring of liquid crystal at the boundary of polymer encapsulation. The polymerizable dispersion or mixture can be tuned by changing the ratio of composition between the non-polymerizable liquid crystal and monomer.

The polymerizable dispersion is formulated to contain a mixture of monomers having single and multiple polymerizable groups to serve different purposes in forming the polymer component. In general, monomers with a single polymerizable group are used as the fillers to form the wall and structure of the encapsulation; monomers with multiple polymerizable groups are used as glues to stabilize the structure; and polar or nonpolar monomers, such as fluorinated or siloxane-containing monomers, are used to form a film to be situated in between the dispersion film and air (or substrate) depending on the device configuration. The polymerizable material can optionally include liquid crystalline polymerizable material. Often, the polymerizable additives are selected from thio-ene, epoxy, divinyl, vinyl ether, oxetane, acrylate or methacrylate compounds comprising single and multiple polymerizable groups.

In certain embodiments, one or more of the polymerizable groups can be represented by the formula

wherein $R^1$ is H, $CH_3$, $CF_3$, or halogen, and W is O or a COO group. In one or more embodiments, the polymerizable group is connected to the monomer molecule via a divalent organic group such as linear alkyl, branched alkyl, aryl, alkylaryl, arylakyl, multiple arylalkyl, alkylmultiplearyl, alkylcycloalkyl, cycloalkylalkyl, hydroxyalkyl, fluoroalkyl, fluoroaryl, alkylsiloxane, siloxanealkyl, siloxanearyl, and arylsiloxane groups. Where an alkylaryl group is present, it may include an oxygen, sulfur, ester, ethylene oxide, or vinyl acetylene linking group.

The formulation for a polymer dispersed cholesteric liquid crystal (PDCLC) comprises from 1 to about 60 weight percent (wt. %) of polymerizable mixture, and more preferably from about 10 to about 40 wt. % of polymerizable mixture, based upon the total weight of the dispersion. The polymerizable mixture preferably contains from 1 to about 99 wt %, more preferably from about 85 to about 95 wt % of at least one monomer with a single polymerizable group.

The amount of the crosslinkable monomer having multiple polymerizable groups (e.g., 2 or more groups per monomer molecule) is from 1 to about 50 wt. %, preferably from 1 to about 30 wt. % and more preferably from about 5 to about 20 wt. %, based upon the total weight of the polymerizable mixture. In certain embodiments, at least a portion of the crosslinkable monomers comprise a polymerizable group that can be represented by the formula above.

Encapsulated ChLC

Photopolymerizable dispersions are prepared by mixing the desired composition of monomer and photoinitiator with a non-polymerizable liquid crystal at room temperature. Ethyl methacrylate [Aldrich, CAS#: 97-63-2], and a crosslinker, trimethylol propane triacrylate [Aldrich, CAS#: 15625-89-5], have good solubility with the liquid crystal, KLC19. Irgacure 651 [Ciba Specialty Chemicals, Inc., CAS#: 24650-42-8] is used for the photoinitiator, as it is readily solubilized in the prepolymer mixture. The F=1.153 prepolymer mixture was composed of 90.5% of ethyl methacrylate (EMA), 7.5% trimethylol propane triacrylate (TRI), and 2% of Irgacure 651 (IRG). Solutions of pre-polymer were vortex-mixed and then added to the liquid crystal, KLC19. KLC19 is a right-handed cholesteric liquid crystal mixture consisting of MDA-01-1955 [EMD Chemicals Inc.] at 79% wt. and MDA-00-3506 [EMD Chemicals Inc.] at 21% wt. for a reflective peak at ~570 nm. The prepolymer (PP) was added to KLC19 (LC) at a ratio of PP:LC=20:80% wt. Once vortex-mixed, 6.5 μm plastic spherical spacers were added to the mixture to preserve substrate spacing before polymerization. The system was mixed again via ultrasonic agitation (to suspend the spacers) and then pipetted between two polycarbonate substrates coated with conductive electrodes. The bead of liquid was then rolled down between the polycarbonate sheets using a rubberized hand roller and any excess was cleaned off. The material was polymerized under an Electro-lite ELC 4001 UV source at 3.75 mW/cm² intensity for approximately 15 minutes. Using Equation 1, the "functionality" of an exemplary formulation can be derived, wherein EMA provides one functional group and TRI provides three functional groups. Using the percentages of 94.5% for EMA and 3.5% for TRI, an exemplary functionality value is derived from Equation (1) as follows:

$$= \frac{(.945 * 1) + (.035 * 3)}{.945 + .035}$$
$$= \frac{1.05}{0.98}$$
$$= 1.071$$

FIG. 1 provides an exemplary schematic of the cell or display. FIGS. 2A-D are an exemplary 12-pixel cell, constructed according to the disclosed process, bent and twisted while switched in a checkerboard pattern. It is also desirable that the cell be manufactured in such a manner that any focal conic area that is unswitched (not electrically driven) have the same amount of light scattering when a nearby pixel is switched to the focal conic state. In other words, a switched focal conic state should be indistinguishable from a non-switched focal conic state. This can be controlled using a relatively lower functionality number and/or the weight ratio of liquid crystal and polymer.

Figure 3A:
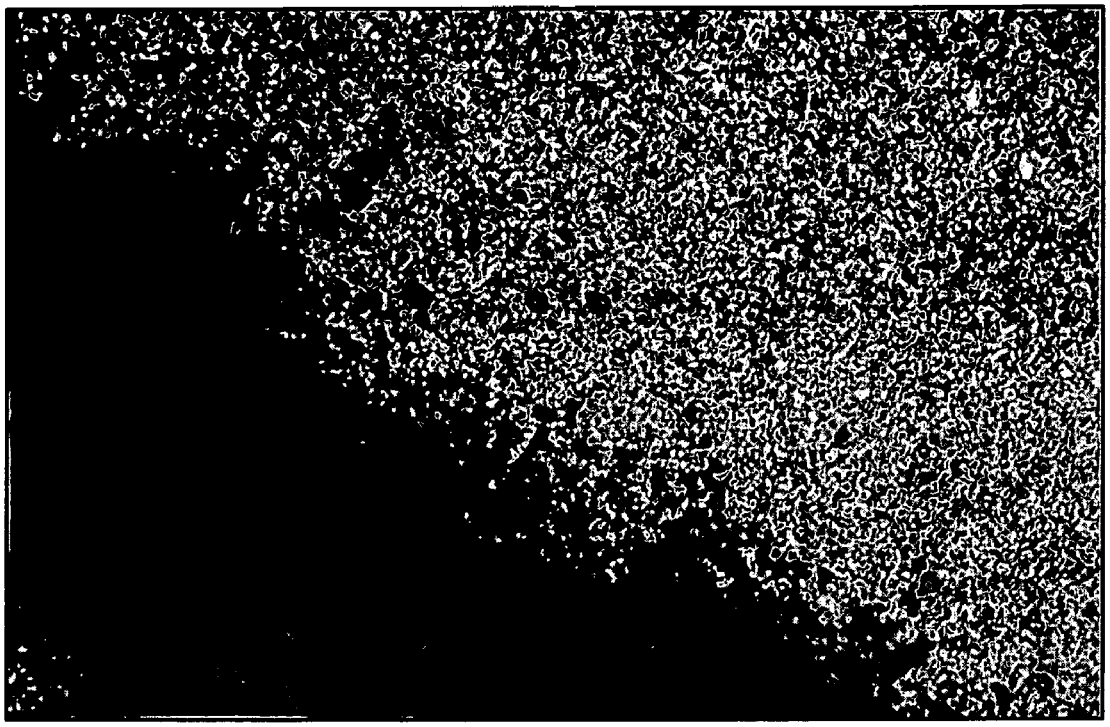
FIG. 3A is a micro-photograph of a poorly encapsulated material that did not rupture along one-droplet-wide fault lines, but instead ruptured along a broad flow radially from the pressure point of origin (bottom left corner)
Figure 3B:
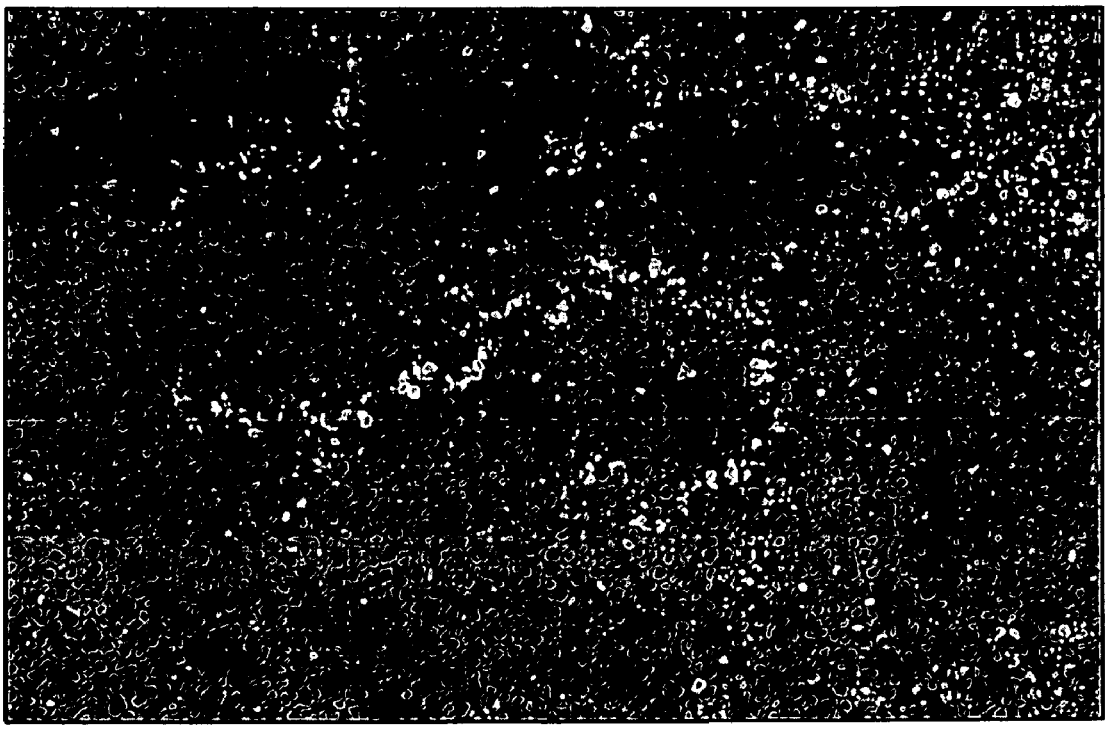
FIG. 3B is a micro-photograph of a well encapsulated material that ruptured along fault lines of flow that are about one droplet wide.

The cell was destructively tested to ensure complete encapsulation. It was found that materials that are completely encapsulated demonstrate a distinctive rupture pattern when localized pressure is applied. One way of destructive testing is to use the end of a paper clip to press the cell at a single point until destructive failure ensues. The droplets or domains immediately under the pressure point rupture and the liquid crystal contained within must flow. As the liquid crystal has no place to flow, it must flow into other weaker-walled droplets or domains. Taking the path of least resistance, the LC flows consecutively into the droplet with the weakest wall. Channels of rupture are created that are substantially one droplet in width. These channels of rupture flow radially out from the point of origin like roots from a tree. FIG. 3A is a micrograph of a sample that was weakly encapsulated, i.e., there are no distinctive channels in this rupture. FIG. 3B is a micrograph of a sample that is well encapsulated as evident by the distinct channels of rupture that were created with localized pressure.

Functionality/UV Control over Droplet Size

Photopolymerizable dispersions are prepared by mixing the desired composition of monomer (EMA), crosslinker (TRI) and photoinitiator (IRG) in a container with a non-polymerizable liquid crystal at the room temperature. Pre-polymer mixtures of varying functionality were mixed according to the following table:

TABLE I

| Mixture #: | 1 | 2 | 3 | 4 | 5 | 6 |
|---|---|---|---|---|---|---|
| Functionality: | 1.0 | 1.074 | 1.125 | 1.177 | 1.231 | 1.278 |
| EMA: | 98.0% | 94.5% | 92.0% | 89.5% | 87.0% | 84.5% |
| TRI: | 0.0% | 3.5% | 6.0% | 8.5% | 11.0% | 13.5% |
| IRG | 2.0% | 2.0% | 2.0% | 2.0% | 2.0% | 2.0% |

Solutions of pre-polymer were vortex-mixed and then added to the liquid crystal, KLC19. The KLC19 mixture consisted of MDA-01-1955 at 79% wt. and MDA-00-3506 at 21% wt. for a reflective peak at ~570 nm. The prepolymers (PP) were added to KLC19 (LC) at a ratio of PP:LC=20:80% wt. Once this was vortex-mixed, 6.5 μm plastic spherical spacers were added to the mixtures to preserve substrate spacing before polymerization. The systems were mixed again via ultrasonic agitation (to suspend the spacers) and then individually pipetted between two polycarbonate substrates coated with conductive electrodes. The beads of liquid within each cell were then rolled down between the polycarbonate sheets using a hand roller and any excess was cleaned off. The material was polymerized under an Electro-lite ELC 4001 UV source at 3.75 mW/cm² intensity. Individual cells of a particular functionality were segmented and each segment was exposed to UV for a set time of 1 minute, 2 minutes, 5 minutes, 7 minutes, 10 minutes, and 15 minutes, respectively.

Figure 4:
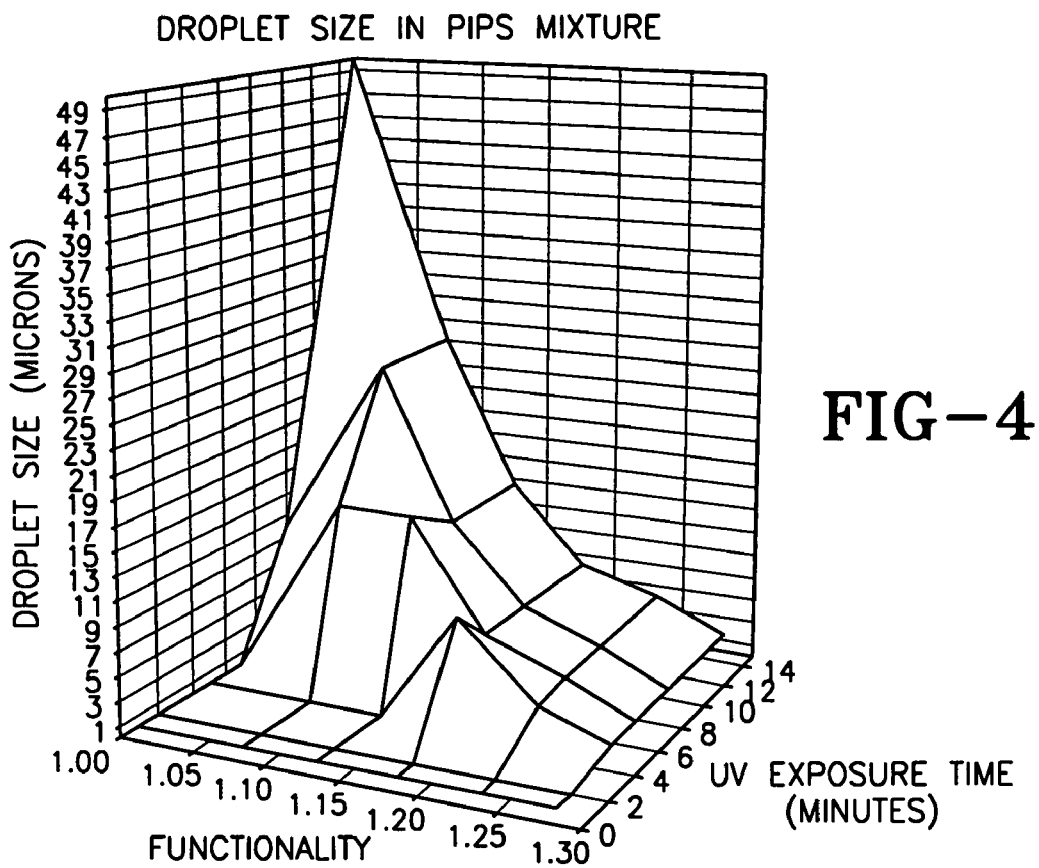
FIG. 4 is a graphical representation of droplet size vs. functionality and UV exposure time for an intensity of 3.75 mW/cm$^2$.
Figure 5:
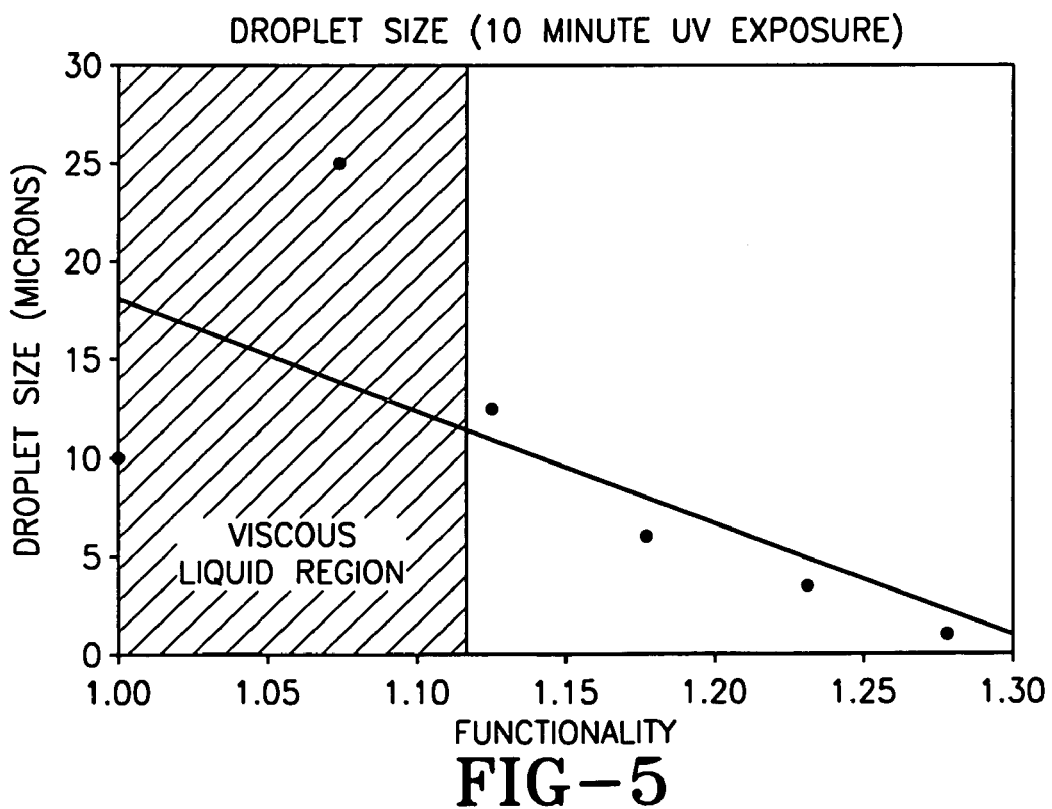
FIG. 5 is a graphical representation of droplet size of encapsulated cholesteric liquid crystal (ChLC) vs functionality of the pre-polymer.

The average droplet size (diameter) was measured for each individual sample (of a particular functionality and exposure time) and plotted accordingly in FIG. 4. The right-hand face of the plot is relatively flat after a certain exposure time has been reached whereas the front face is rough. From this, it can be inferred that once the droplets have formed and the polymer has solidified, the size remains constant no matter what the exposure time. If a critical functionality has not been reached, the mixture will not completely polymerize regardless of the exposure time—thus, droplets can coalesce into larger drops in this viscous fluid as the film is not solid. From this plot it can be seen that the preferable method to control droplet size is through changing the functionality for a given exposure and intensity. In FIG. 5, it can be seen that for a given exposure of 3.75 W/cm$^2$ at 10 minutes, droplet size can be controlled within the range from 1 to 12 microns by adjusting the functionality of the dispersion from 1.13 to 1.3.

Figure 6:
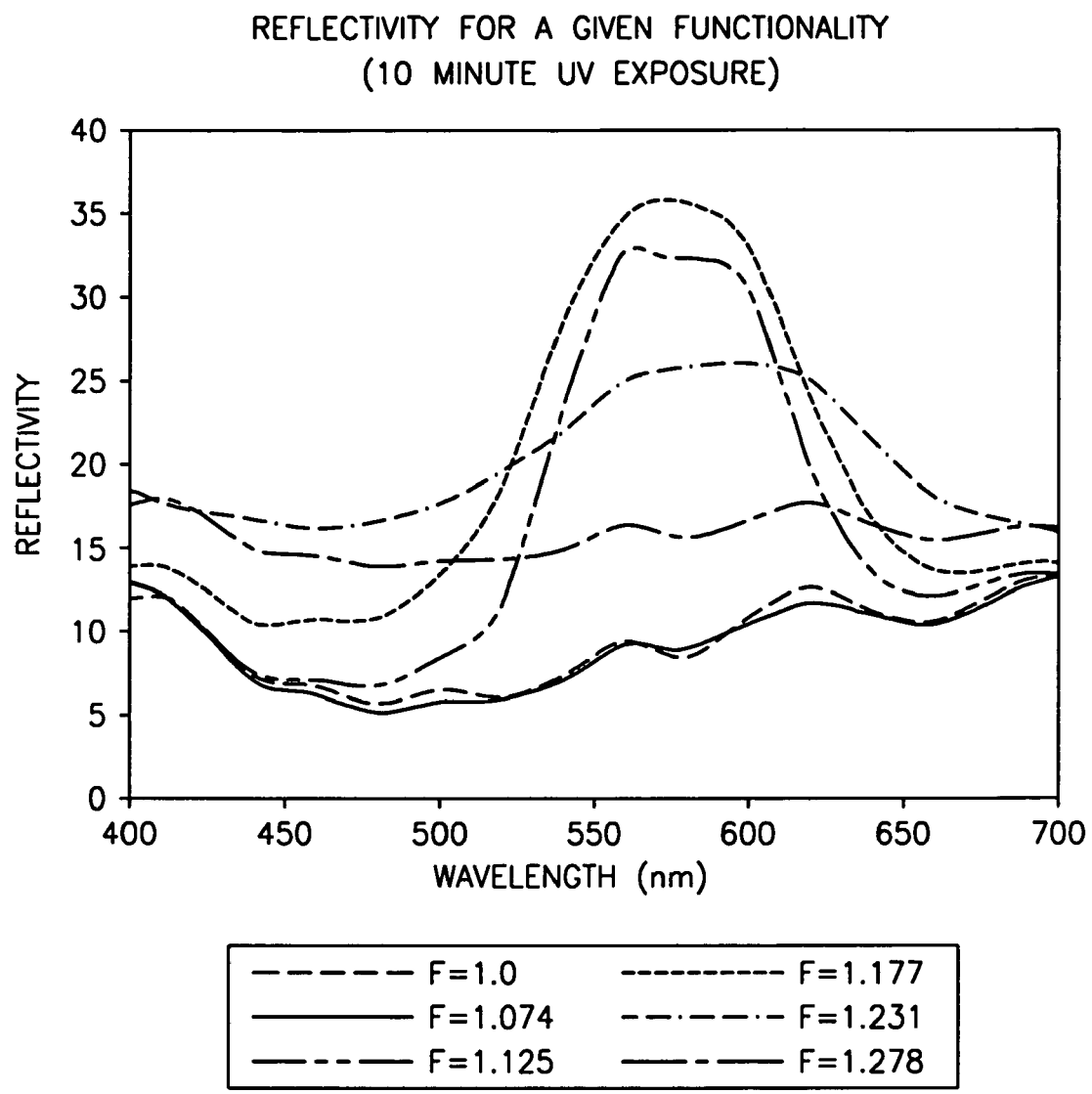
FIG. 6 is a graphical representation of reflectivities of various functionalities, i.e., droplet sizes vs. wavelengths, wherein the reflectivity is optimal for F~1.177.

The reflectivity can be optimized by controlling the functionality. In FIG. 6, the reflectivity as a function of wavelength (nm) is plotted for the functionalities in Table 1. It appears that the smaller drops (~6 μm) formed by the 1.177 functionality generate the brightest reflection. However, larger droplets (~13 μm or larger) formed by the 1.125 functionality were not as bright. This may be from excess polymer that is not able to migrate out of the droplet or domain before solidification. The polymer trapped within the droplet contributes to defects in the planar texture of the liquid crystal thereby decreasing the reflectivity. Smaller droplets (≦3 μm) did not provide strong reflectivities. In FIG. 6 it can also be seen that droplets formed by F≦1.074 had no reflective peaks because these systems were not completely polymerized, see FIG. 5.

Wall Thickness Control

Photopolymerizable dispersions are prepared by mixing the desired composition of monomer (EMA), crosslinker (TRI) and photoinitiator (IRG) in a container with a non-polymerizable liquid crystal at the room temperature. An F=1.153 prepolymer mixture was composed of 90.5% EMA, 7.5% TRI, and 2% IRG whereas an F=1.101 prepolymer mixture was composed of 93.1% EMA, 4.9% TRI, and 2% IRG. Solutions of pre-polymer were vortex-mixed and then added to the liquid crystal, KLC19. The KLC19 mixture consisted of MDA-01-1955 at 79% wt. and MDA-00-3506 at 21% wt. for a reflective peak at ~570 nm. Prepolymer mixtures of two functionalities were mixed at selective ratios with KCL19 according to the following chart (given in wt. % of PP:LC):

TABLE II

| Mixture: | Wt. % of PP:LC | | | | | |
|---|---|---|---|---|---|---|
| | A | B | C | D | E | F |
| F = 1.153 | 15:85 | 20:80 | 25:85 | 30:70 | 35:75 | 40:60 |
| F = 1.101 | 15:85 | 20:80 | 25:85 | 30:70 | 35:75 | 40:60 |

Once this was vortex-mixed, 6.5 μm plastic spherical spacers were added to the mixtures to preserve substrate spacing before polymerization. The systems were mixed again via ultrasonic agitation (to suspend the spacers) and then individually pipetted between two polycarbonate substrates coated with conductive electrodes. The beads of liquid within each cell were then rolled down between the polycarbonate sheets using a hand roller and any excess was cleaned off. The material was polymerized under an Electro-lite ELC 4001 UV source at 3.75 mW/cm$^2$ intensity. Individual cells of a particular functionality and PP:LC concentration were segmented and each segment was exposed to UV for a set time of 8 minutes, 10 minutes, 13 minutes, 18 minutes, and 23 minutes, respectively. After polymerization, the cells were examined by polarizing microscope and evaluated.

Figure 7:
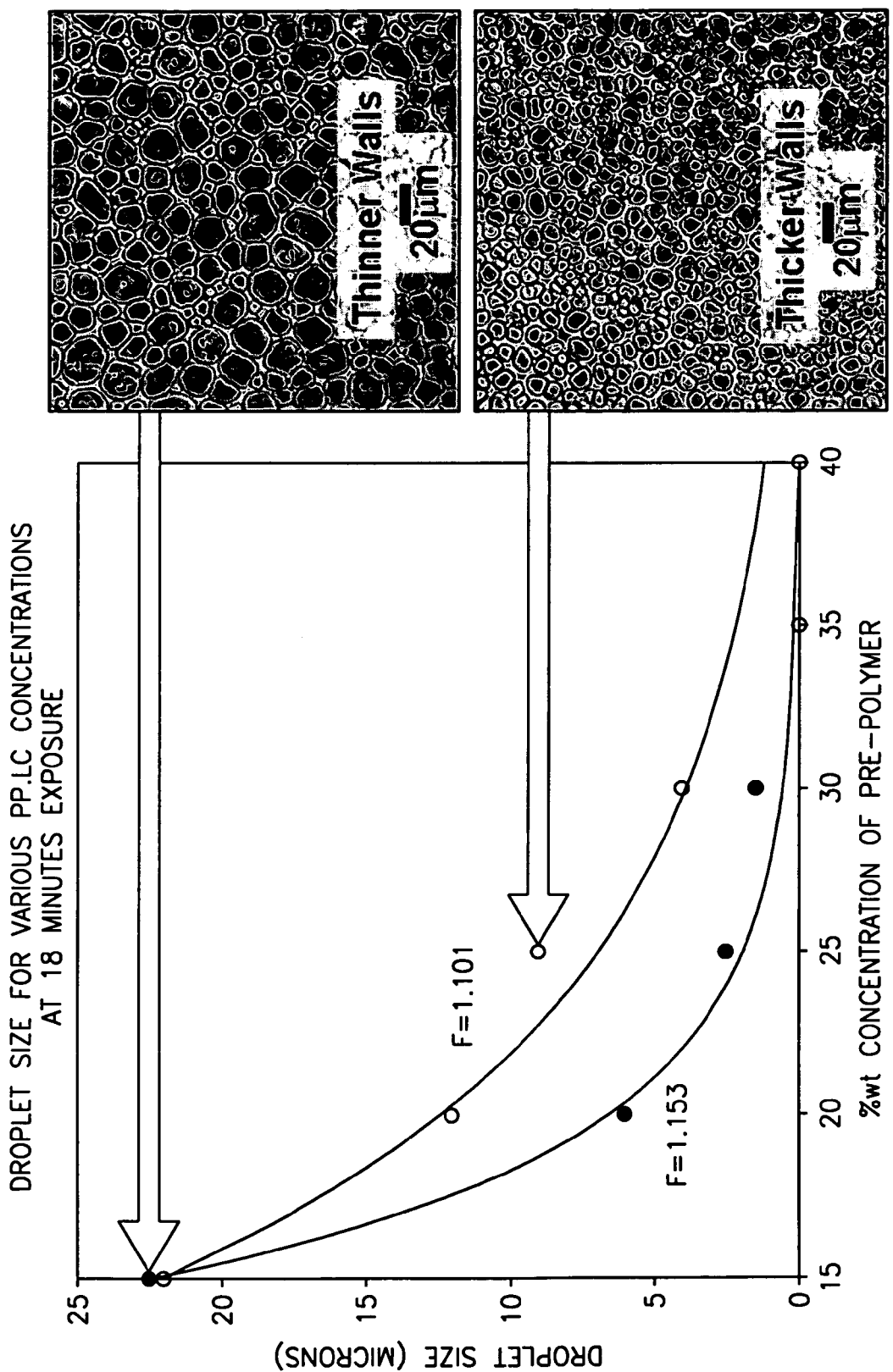
FIG. 7 is a graphical representation of droplet size of encapsulated ChLC vs. % weight concentration of pre-polymer in a 6.5 μm cell, wherein the lower functionality material has larger droplets than the higher functionality material, and wherein the inset micro-photographs depict both thinner and thicker wall structures with the arrows pointing to the corresponding data points.

It was determined that the droplet size is also controllable by the concentration of pre-polymer to liquid crystal. In FIG. 7, the concentration of pre-polymer to liquid crystal was varied for a given functionality and the droplet size was plotted. The exposure was 3.75 W/cm$^2$ for 18 minutes to ensure complete polymerization. In general, the lower functionality material formed larger droplets than the higher functionality material for a given PP:LC ratio. Droplet size decreases exponentially as the concentration of polymer in the system is increased. Systems with a higher concentration of pre-polymer resulted in thicker polymer walls (2~4 μm) between droplets whereas systems with less polymer had thinner walls (1~2 μm) as seen in the inset micrographs of FIG. 7. Therefore, by increasing the amount of polymer in the system, the boundary wall thickness can be controlled and used to modify mechanical properties of the system such as strength of the walls and flexibility of the LCD.

Reflected Color Control

Photopolymerizable dispersions are prepared by mixing the desired composition of monomer (EMA), crosslinker (TRI) and photoinitiator (IRG) in a container with a non-polymerizable liquid crystal at the room temperature. An F=1.153 prepolymer mixture was composed of 90.5% EMA, 7.5% TRI, and 2% IRG. Solutions of pre-polymer were vortex-mixed and then added to the liquid crystal, KLC19. KLC19 is a right-handed cholesteric liquid crystal mixture consisting of MDA-01-1955 and MDA-00-3506 mixed in proper proportion for the appropriate color, see table below:

TABLE III

| | RGB ChLC Mixing: | | |
|---|---|---|---|
| | Red $\lambda_p$~ 630 nm | Green $\lambda_p$~ 563 nm | Blue $\lambda_p$~ 473 nm |
| MDA-01-1955 | 70.5% | 79.3% | 97.5% |
| MDA-00-3506 | 29.5% | 20.7% | 2.5% |

Figure 8:
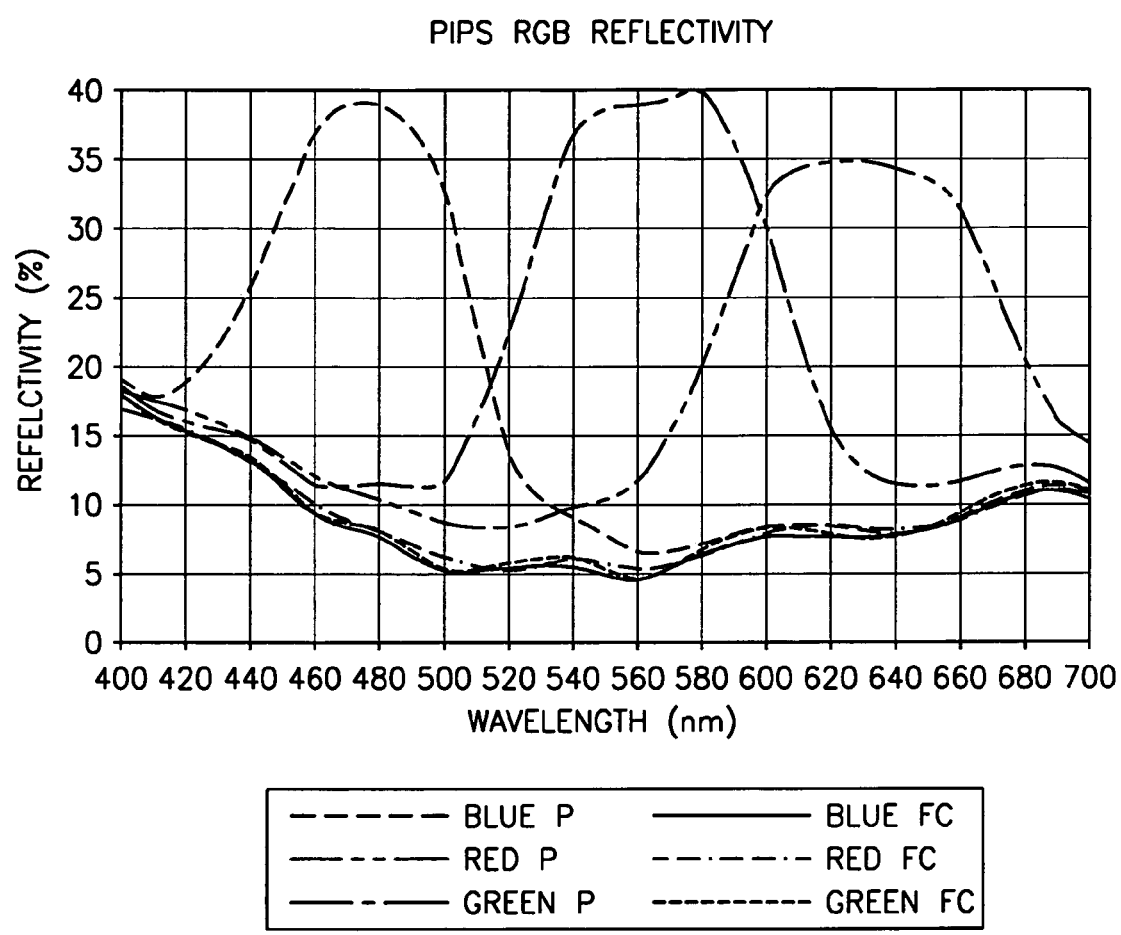
FIG. 8 is a graphical representation of the red, green, and blue reflectivities of 3 exemplary cells in the planar (P) and focal conic (FC) states.

The prepolymer (PP) was added to KLC19 (LC) at a ratio of PP:LC=20:80% wt. Once this was vortex-mixed, 6.5 μm plastic spherical spacers were added to the mixtures to preserve substrate spacing before polymerization. The system was mixed again via ultrasonic agitation (to suspend the spacers) and then pipetted between two polycarbonate substrates coated with conductive electrodes. The bead of liquid was then rolled down between the polycarbonate sheets using a hand roller and any excess was cleaned off. The three cells were polymerized under an Electro-lite ELC 4001 UV source at 3.75 mW/cm$^2$ intensity for approximately 15 minutes. In FIG. 8, it can be seen that RGB colors can be realized with the system up to reflectivities of 40% or more. Hence, the system pre-polymer is not sensitive to the twisting power of the liquid crystal and any visible color can be realized in the system. The contrast ratio of a typical sample constructed according to the above process is on the order of 30:1 or greater.

Multiplexible System for Passive Matrix Driving

Figure 9:
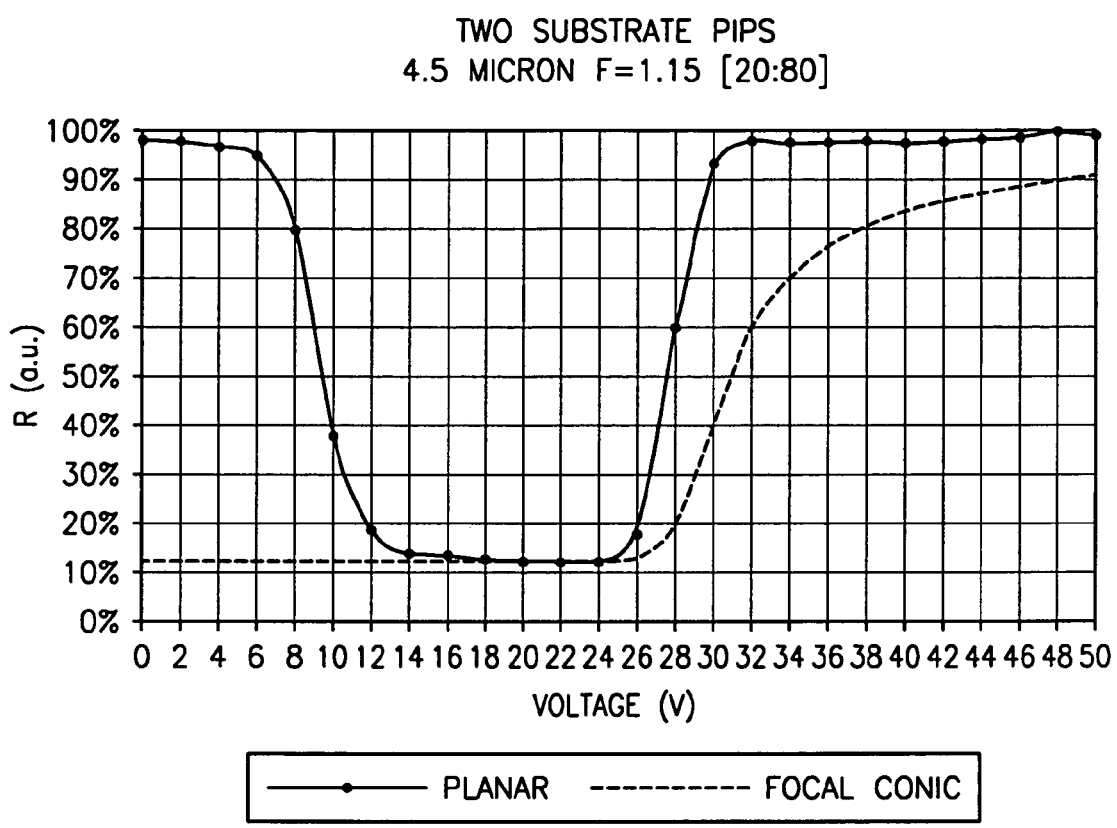
FIG. 9 is a graphical representation of an electro-optic response of an exemplary 4.5 μm PIPS cell.

Photopolymerizable dispersions are prepared by mixing the desired composition of monomer (EMA), crosslinker (TRI) and photoinitiator (IRG) in a container with a non-polymerizable liquid crystal at the room temperature. An F=1.153 prepolymer mixture was composed of 90.5% EMA, 7.5% TRI, and 2% IRG. Solutions of pre-polymer were vortex-mixed and then added to the liquid crystal, KLC19. The KLC19 mixture consisted of MDA-01-1955 at 79% wt. and MDA-00-3506 at 21% wt. for a reflective peak at ~570 nm. The prepolymer (PP) was added to KLC19 (LC) at a ratio of PP:LC=20:80% wt. Once this was vortex-mixed, 4.5 μm plastic spherical spacers were added to the mixture to preserve substrate spacing before polymerization. The system was mixed again via ultrasonic agitation (to suspend the spacers) and then pipetted between two polycarbonate substrates coated with conductive electrodes. The bead of liquid was then rolled down between the polycarbonate sheets using a hand roller and any excess was cleaned off. The material was polymerized under an Electro-lite ELC 4001 UV source at 3.75 mW/cm$^2$ intensity for approximately 15 minutes. In FIG. 9 we can see a typical electro-optic response for the material as it is driven through the focal conic and planar states. When looking at the planar curve, it can be seen that the voltage, $V_1 \cong 6v$, is greater than $(V_{H \rightarrow P} - V_3)/2 \cong (32v-24v)/2=4v$. This indicates the system is multiplexible and therefore can be driven passively.

EXAMPLE 1

An operable cholesteric layer was fabricated between two indium-zinc oxide (IZO)-patterned 127 μm polycarbonate sheets using droplet dispersions by the PIPS method. The F=1.153 prepolymer mixture was composed of 90.5% of ethyl methacrylate [Aldrich, CAS#: 97-63-2], 7.5% trimethylol propane triacrylate [Aldrich, CAS#: 15625-89-5], and 2% of Irgacure 651 [Ciba Specialty Chemicals, CAS#: 24650-42-8]. Solutions of pre-polymer were vortex-mixed and then added to the liquid crystal, KLC19. KLC19 is a right-handed cholesteric liquid crystal mixture consisting of MDA-01-1955 [EMD] at 79% wt. and MDA-00-3506 [EMD] at 21% wt. for a reflective peak at ~570 nm. The prepolymer (PP) was added to KLC19 (LC) at a ratio of PP:LC=20:80% wt. Once this was vortex-mixed, 4.5 μm plastic spherical spacers were added to the mixture to preserve substrate spacing before polymerization. The system was mixed again via ultrasonic agitation (to suspend the spacers) and then pipetted between two polycarbonate substrates coated with conductive electrodes. The bead of liquid was then rolled down between the polycarbonate sheets using a hand roller and any excess was cleaned off. The material was polymerized under an Electro-lite ELC 4001 UV source at 3.75 mW/cm$^2$ intensity for approximately 15 minutes. During the curing process, the pre-polymer mixture polymerizes causing the liquid crystal to phase separate into droplets. After curing, the display was flexible, multiplexible, and highly reflective (reflecting about 38% of impinging light).

EXAMPLE 2

An operable cholesteric layer was fabricated between two IZO-patterned 127 μm polycarbonate sheets using droplet dispersions by the PIPS method. The F=1.153 prepolymer mixture was composed of 90.5% of ethyl methacrylate [Aldrich, CAS#: 97-63-2], 7.5% trimethylol propane triacrylate [Aldrich, CAS#: 15625-89-5], and 2% of Irgacure 651 [Ciba Specialty Chemicals, CAS#: 24650-42-8]. Solutions of pre-polymer were vortex-mixed and then added to the liquid crystal, KLC19. KLC19 is a right-handed cholesteric liquid crystal mixture consisting of MDA-01-1955 [EMD] at 79% wt. and MDA-00-3506 [EMD] at 21% wt. for a reflective peak at ~570 nm. The prepolymer (PP) was added to KLC19 (LC) at a ratio of PP:LC=25:75% wt. Once this was vortex-mixed, 6.5 μm plastic spherical spacers were added to the mixture to preserve substrate spacing before polymerization. The system was mixed again via ultrasonic agitation (to suspend the spacers) and then pipetted between two polycarbonate substrates coated with conductive electrodes. The bead of liquid was then rolled down between the polycarbonate sheets using a hand roller and any excess was cleaned off. The material was polymerized under an Electro-lite ELC 4001 UV source at 3.75 mW/cm$^2$ intensity for approximately 15 minutes. During the curing process, the pre-polymer mixture polymerizes causing the liquid crystal to phase separate into droplets. The droplets were spaced apart by thick, ~2-4 μm polymer walls. This mixture produced a display that was well encapsulated and more mechanically robust than Example 1. After curing, the display was flexible, multiplexible, and reflective.

EXAMPLE 3

An operable cholesteric PIPS layer was created by filling an ITO-patterned glass cell with a pre-polymer and LC solution and polymerizing. The prepolymer mixture was composed of 90.5% of ethyl methacrylate [Aldrich, CAS#: 97-63-2], 7.5% trimethylol propane triacrylate [Aldrich, CAS#: 15625-89-5], and 2% of Irgacure 651 [Ciba Specialty Chemicals, CAS#: 24650-42-8]. Solutions of pre-polymer were vortex-mixed and then added to the liquid crystal, KLC19. KLC19 is a right-handed cholesteric liquid crystal mixture consisting of MDA-01-1955 [EMD] at 79% wt. and MDA-00-3506 [EMD] at 21% wt. for a reflective peak at ~570 nm. The prepolymer (PP) was added to KLC19 (LC) at a ratio of PP:LC=20:80% wt. A 5 μm 240×30 ITO pixel glass Infosign© cell was pre-assembled with an open gap on one edge. The cell was placed in a vacuum and pumped down to an atmospheric pressure of 20 μm of Mercury. At vacuum, the open end of the cell was immersed in a trough of KLC19 and began to fill by capillary forces. Atmosphere was allowed to flood back into the chamber and the cell began to fill with KLC19 more rapidly. Once there was a 1 cm plug of LC, the cell was removed from the trough and placed into a PIPS solution-filled aluminum foil pocket and sealed. The cell was filled with the PIPS solution after 2 hours but was allowed to diffusively mix for 2 days afterwards in a cool dark environment. The material was polymerized under a piece of IZO-coated polycarbonate (used as a light-filter) in an Electro-lite ELC 4001 UV source at 3.75 mW/cm$^2$ intensity for approximately 15 minutes. During the curing process, the pre-polymer mixture polymerized causing the liquid crystal to phase separate into droplets. After curing, the display was multiplexible, bistable, and highly reflective. The system did not suffer from any pressure points when pressed, as the liquid crystal was completely encapsulated.

Based upon the foregoing, the advantages of the present invention are readily apparent. Particularly, the display 10 and the method for forming the display provide for a flexible cholesteric display. In particular, the flexible display disclosed provides all of the advantages of a cholesteric display—low power, passive addressing, cheaper drive schemes and the like—while also providing for flexibility in the display. Accordingly, the display is conformable to a desired shape in a one or two-dimension curvature. By utilizing encapsulated liquid crystal domains the display allows for minimization of pressure point destruction. In other words, application of a localized pressure on the display will only destroy those encapsulated domains directly exposed to the directed pressure. Accordingly, the disclosed displays and attendant methods provide for a multi-plexible, bistable and reflective display that is flexible.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A bistable polymer dispersed liquid crystal display comprising:
   at least one substrate;
   a polymerized liquid crystal dispersion disposed on said at least one substrate, said dispersion comprising a plurality of domains, wherein said liquid crystal dispersion comprises at least a non-polymerizable liquid crystal material, a mixture of polymerizable monomers, and a polymerization initiator, wherein said polymerizable monomers comprise one or more polymerizable groups; and
   wherein a size of each said domain is controlled by a functionality of said polymerizable monomers defined by $$F = \sum_{x=1}^{n} f_x^* M_x \bigg/ \sum_{x=1}^{n} M_x,$$

wherein F is functionality,
$f_x$ is the number of polymerizable groups,
$M_x$ is a mass fraction of the dispersion material, and
n is the number of polymerizable monomers in said dispersion.

2. The display according to claim 1, wherein each said domain has a polymeric boundary wall adjoined to an adjacent domain.

3. The display according to claim 2, wherein said non-polymerizable liquid crystal material comprises a cholesteric liquid crystal.

4. The display according to claim 2, further comprising:
   a pair of opposed substrates having said liquid crystal dispersion received between said substrates, each said substrate having a facing surface with an electrode disposed thereon.

5. The display according to claim 4, wherein said substrates are made from a flexible plastic material.

6. The display according to claim 4, wherein said substrates are made from a glass material.

7. The display according to claim 4, wherein said electrodes are made from a transparent conductive metal.

8. The display according to claim 4, wherein said electrodes are made from a conducting polymer.

9. The display according to claim 4, wherein said electrodes are made from a conductive blend of carbon nanotubes.

10. The display according to claim 2, wherein said liquid crystal dispersion is formed from at least a non-polymerizable liquid crystal material, a mixture of polymerizable monomers, and a polymerization initiator, and wherein a size of said domain is controlled by a ratio of non-polymerizable liquid crystal material to said polymerizable monomers and said polymerizable initiator.

11. The display according to claim 1, wherein said mixture of polymerizable monomers comprises mono- and multi-functional monomers.

12. The display according to claim 11, wherein said liquid crystal dispersion further comprises one or more surfactants and block co-polymers.

13. The display according to claim 1, wherein said polymerizable monomers comprise a thio-ene, epoxy, divinyl, vinyl ether, oxetane, acrylate, or methacrylate monomer, or mixture thereof.

14. The display according to claim 1, wherein said mixture of polymerizable monomers comprises at least one monomer with a single polymerizable group and at least one monomer with multiple polymerizable groups.

15. The display according to claim 14, wherein said single polymerizable group and said multiple polymerizable groups each independently are selected from thio-ene, epoxy, divinyl, vinyl ether, oxetane, acrylate, and methacrylate groups.

16. The display according to claim 14, wherein said single polymerizable group can be represented by the formula

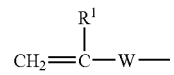

wherein $R^1$ is H, $CH_3$, $CF_3$, or halogen, and W is O or a COO group.

17. The display according to claim 14, wherein one or more of said multiple polymerizable groups can be represented by the formula

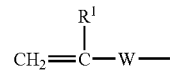

wherein $R^1$ is H, $CH_3$, $CF_3$, or halogen, and W is O or a COO group.

18. A method of preparing a polymer dispersed liquid crystal display, comprising:
   mixing a liquid crystal dispersion comprising a non-polymerizable liquid crystal material, a mixture of polymerizable monomers, and a polymerization initiator;
   phase separating said liquid crystal dispersion into a plurality of domains; and
   controlling a size of each said domain by selecting the functionality of said polymerizable monomers, wherein said polymerizable monomers comprise one or more polymerizable groups, and wherein the functionality of said polymerizable monomers is defined by $$F = \sum_{x=1}^{n} f_x^* M_x \bigg/ \sum_{x=1}^{n} M_x,$$

wherein F is functionality, $f_x$ is the number of polymerizable groups, $M_x$ is a mass fraction of the dispersion material, and n is the number of polymerizable monomers in said dispersion.

19. The method according to claim 18, wherein said phase separating step comprises:

phase separating by polymerizing said liquid crystal dispersion.

20. The method according to claim 18, further comprising:

disposing said liquid crystal dispersion on a substrate.

21. The method according to claim 18, further comprising:

disposing said liquid crystal dispersion between a pair of opposed substrates.

22. The method according to claim 18, further comprising:

disposing said liquid crystal dispersion between a pair of opposed flexible plastic substrates having at least one electrode disposed on each facing surface.

23. The method of claim 18, wherein said polymerizable groups are selected from thio-ene, epoxy, divinyl, vinyl ether, oxetane, acrylate, and methacrylate groups.

24. The method of claim 18, further comprising:

disposing said liquid crystal dispersion between a pair of opposed flexible plastic substrates having at least one electrode disposed on each facing surface; and selecting said functionality so that a switched focal conic state is substantially indistinguishable from an unswitched focal conic state.

25. The method of claim 18, further comprising:

disposing said liquid crystal dispersion between a pair of opposed flexible plastic substrates having at least one electrode disposed on each facing surface; and selecting a weight ratio of liquid crystal and polymer so that a switched focal conic state is substantially indistinguishable from an unswitched focal conic state.

26. The method according to claim 18, further comprising:

controlling a size of each said domain by adjusting a ratio of said non-polymerizable liquid crystal material to said polymerizable monomers and said polymerizable initiator.

27. The method of claim 18, wherein said mixture of polymerizable monomers includes mono- and multi-functional monomers.

* * * * *